June 2, 1970  J. E. MILLS  3,514,814
SOLE MOLD ASSEMBLIES
Filed July 1, 1966  3 Sheets-Sheet 1

Inventor
John E. Mills
By his Attorney

June 2, 1970  J. E. MILLS  3,514,814
SOLE MOLD ASSEMBLIES
Filed July 1, 1966  3 Sheets-Sheet 2

United States Patent Office 3,514,814
Patented June 2, 1970

3,514,814
SOLE MOLD ASSEMBLIES
John E. Mills, Leicester, England, assignor to USM Corporation, Flemington, N.J., a corporation of New Jersey
Filed July 1, 1968, Ser. No. 741,500
Claims priority, application Great Britain, Sept. 23, 1967, 43,371/67
Int. Cl. B29c 1/00
U.S. Cl. 18—42                             3 Claims

ABSTRACT OF THE DISCLOSURE

A sole mold assembly including first and second mold members movable relative to each other between a first position in which the mold members are separated and a second position in which the mold members are in engagement with each other. The second mold member has two recesses located side by side, each recess having the configuration of a shoe bottom unit. The second mold member is provided with a bridge portion which extends outwardly from the second mold member and which interconnects the two recesses. The first mold member has recesses or raised portions as required to complete the mold cavities to be formed when the two mold members are brought into engagement. In addition, the first mold member is provided with a sprue passage comprising a channel disposed to receive the bridging portion of the second mold member when the two mold members are in engagement. The dimensions of the bridging portion and the channel are such as to leave clearance therebetween whereby to form a passageway connecting the mold cavities with a delivery bore located in the first mold member.

BACKGROUND OF THE INVENTION

Field of the invention

This invention relates to injection molding and is directed more particularly to the injection molding of footwear soles.

Description of the prior art

In the injection molding of shoe sole units it is convenient to utilize a mold assembly which provides two mold cavities whereby two units (a left and a right) may be molded simultaneously. Such a mold assembly may comprise two or more mold members movable relative to each other between a separated position and an engaged position in which the mold members define two mold cavities each in the form of a shoe bottom unit. Means are provided for injecting fluid molding material into the closed cavities formed by the mold members.

In the use of mold assemblies of the type above described there have heretofore been two generally unsatisfactory alternatives. On the one hand, material has been injected into the mold cavities through side surfaces of the mold assembly, the side surfaces of the mold assembly corresponding to the side edge faces of the units being molded. This arrangement provides a system in which the sprue may be removed from the mold members with the molded units. However, the sprue must be removed from the edge of the molded unit and such removal produces a scar which remains visible after attachment of the molded sole to a shoe upper.

On the other hand, material has been injected through bores formed through one of the mold members, which bores enter the cavities through surfaces corresponding to attachment surfaces of the molded units which are later secured to footwear upper assemblies. This approach permits the production of unblemished visible surfaces in the completed shoe. However, when molded shoe bottom units are removed from the cavities the sprue is generally broken off and remains in the bores from which it can be removed only with some delay and/or difficulty.

SUMMARY OF THE INVENTION

It is an object of the present invention to provide an improved mold assembly for use in the molding of shoe bottom units, which assembly will not only produce units having desirable surface finishes, but will also provide for easy and convenient sprue removal from the molds.

With the above and other objects in view, as will hereinafter appear, a feature of the present invention is the provision in a mold assembly of the type above referred to of first and second mold members movable between a separated position and an engaged position in which the mold members cooperate to form two side-by-side mold cavities in the form of shoe bottom units. The second mold member is characterized by two side-by-side recesses and a bridge portion extending outwardly from the engagement surface of the mold member and also extending from a lip of one recess to a lip of the other recess. The assembly further includes a first mold member having two side-by-side recesses or raised portions corresponding to the recesses of the second mold member, and also having a sprue passage interconnecting the two recesses and cooperative with the bridging portion of the first mold member when the two mold members are in engagement to form a passage interconnecting the two mold cavities and a delivery bore disposed in the first mold member.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

DESCRIPTION OF THE PREFERRED EMBODIMENTS

Figure 1:
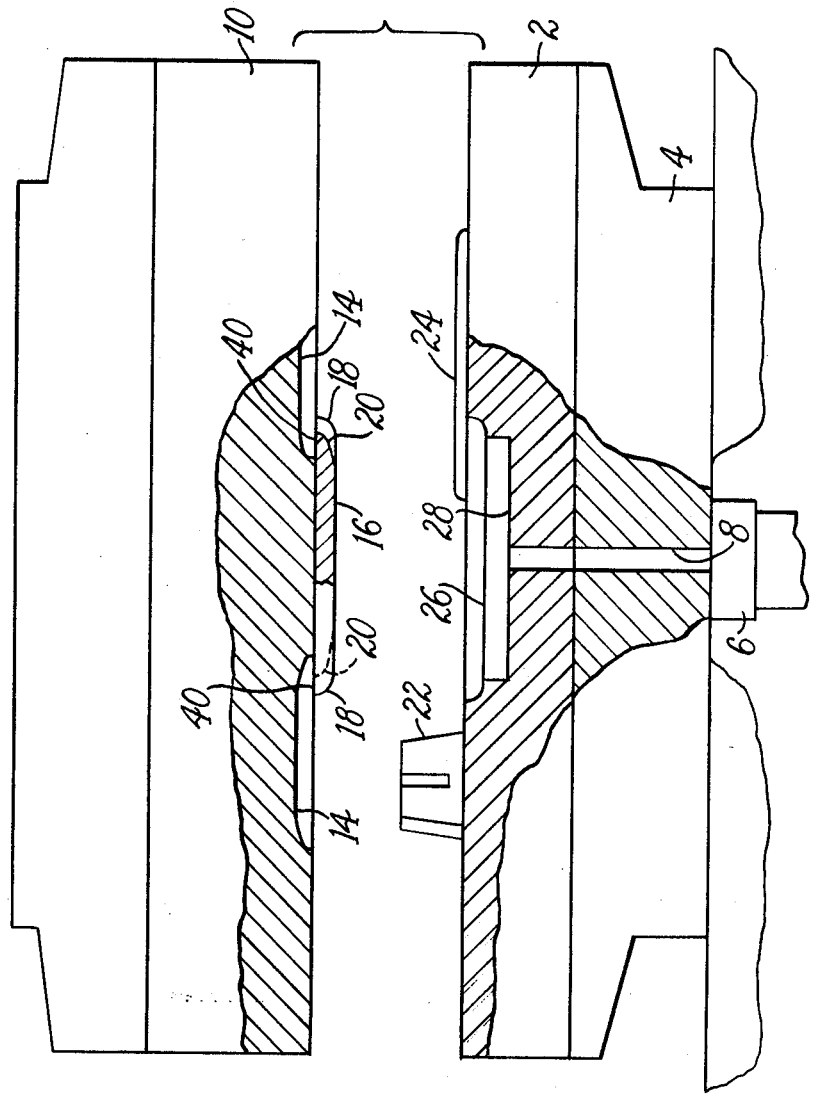
FIG. 1 is an elevational view, partly in section, of one form of mold assembly illustrative of an embodiment of the invention.
Figure 2:
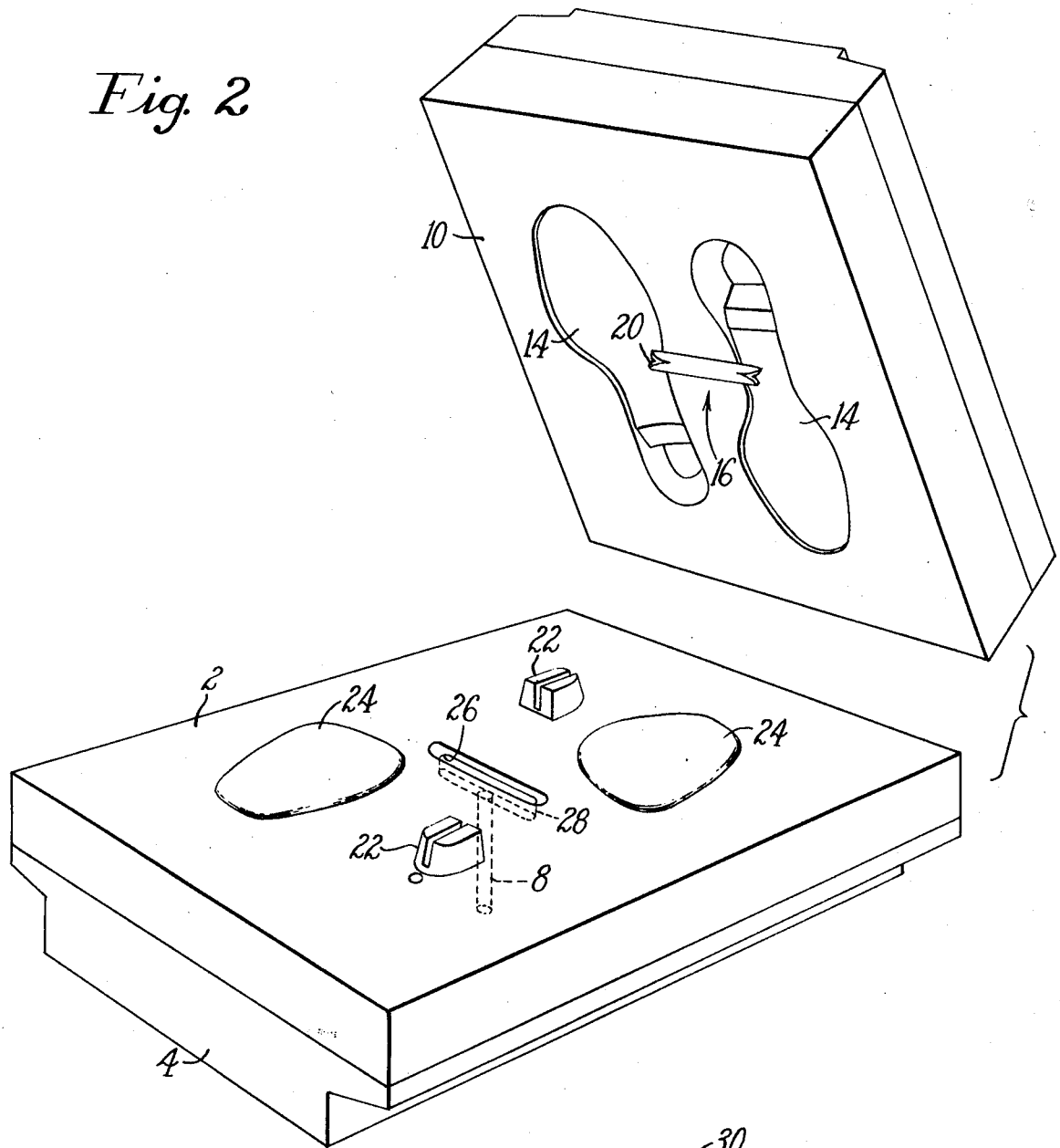
FIG. 2 is a perspective view of the illustrative mold assembly with the mold members in a sepaarted position.

Referring to FIGS. 1 and 2, it will be seen that the illustrative mold assembly comprises a first mold member 2 secured to a base plate 4 and engageable with an injection nozzle 6 for the supply of plastic material through a bore 8. A second mold member 10 is mounted on a moving means (not shown) for movement between a first position in which the mold members 2, 10 are separated, as shown in FIG. 2, for example, and a second position in which the first and second mold members are in engagement with each other.

In the engagement surface of the second mold member are two recesses 14, each in the form of one of a pair of shoe bottom units. Secured to the engagement surface of the second mold member and disposed between the shank portions of the recesses is a bridge portion 16 extending from one recess to the other. The bridge portion 16 has a generally semi-cylindrical cross-section for the greater part of its length except for rounded opposite end portions 18 which are each arranged to project over an edge of one recess. A groove 20 is provided in each of the rounded surfaces of the end portions 18 running longitudinally of the member 16.

On the corresponding engagement surface of the first mold member 2 there may be arranged projections 22 adapted to be received in heel portions of the recesses 14 to provide a more lightweight heel construction for the finished shoe bottom units. Similarly, raised portions 24 may be arranged on the first mold member to provide a more flexible forepart to the finished units.

The engagement surface of the first mold member 2 is provided with a channel 26 connecting in its center portion with the bore 8 through which plastics material is injected. The channel 26 is disposed on the first mold member in such a manner as to receive the bridging portion 16 of the second mold member when the first and second mold members are in engagement. The channel 26 is somewhat deeper than the height of the bridge portion 16 to leave a clearance 28 between the semi-cylindrical surface of the bridge member 16 and the bottom of the channel 26.

In operation of the illustrative mold assembly, the mold members are movable relative to each other whereby to bring their engagement surfaces into contact, the bridge member 16 being received in the channel 26. Plastics material is then injected into the assembly through the nozzle 6, the bore 8 and into the clearance 28. The material is forced through two passageways, each bounded by one end wall of the channel 26 and the walls of the groove 20 in the rounded end portions 18 of the member 16, and into the two cavities formed by the recesses 14, the cavities having been closed by the engagement surface of the first mold member 2. When the injection molding material has set, the shoe bottom units thus formed may be removed by separating the mold members 2, 10 to the separated position, whereupon the molded units are easily removed from the recesses 14.

Figure 3:
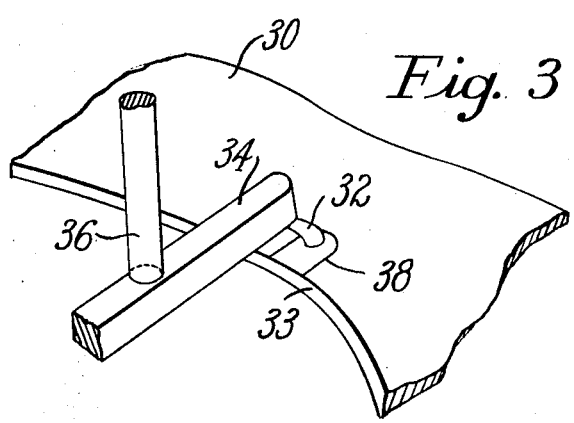
FIG. 3 is a fragmentary perspective view showing a portion of a sole unit formed in the illustrative mold assembly before the sprue is removed.

Referring to FIG. 3, there may be seen a fragmentary view of the shank portion of one molded unit 30 before the sprue has been removed. A narrow neck of sprue 32 projects from the attachment surface of the unit at a point a little distance from a side edge face 33 thereof and is in the shape of the passage formed by the end wall of the cavity 26 and the walls of the groove 20. Attached to the opposite end of the neck 32 is a piece of sprue 34 which is in the shape of the clearance 28. A further sprue portion 36 corresponds to the bore 8. In FIG. 3, it will be seen that the surface of the unit 30 shown therein as uppermost, i.e., the attachment surface, is formed mainly by contact with the engagement surface of the first mold member 2, except for an area bounded by a molding line designated 38 which is formed by contact with a surface 40 (FIG. 1) on the end portion 18 of the member 16 secured to the second mold member 10. The molding line 38 is formed by the juncture of the surface 40 with the engagement surface of the mold member 2.

The sprue, which still interconnects the two shoe bottom units after the completion of the molding operation, may be easily removed from the finished units which will bear no scarred portions on surfaces which will be visible when the units are eventually fixed to a footwear upper to produce a completed shoe.

The mold assemblies are suitable for use in injection sole molding machines known in the art, as for example that shown in U.S. Pat. No. 3,358,333 issued Dec. 19, 1967, upon application of C. J. Kitchener et al.

Figure 4:
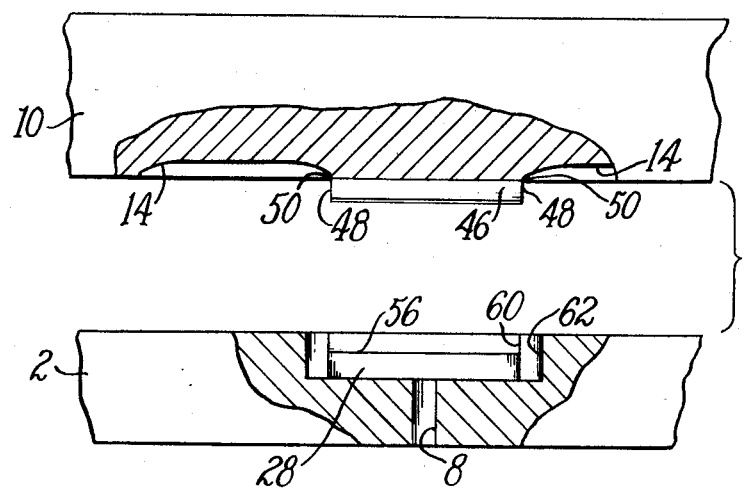
FIG. 4 is similar to FIG. 1, but shows an alternative embodiment of the invention.
Figure 5:
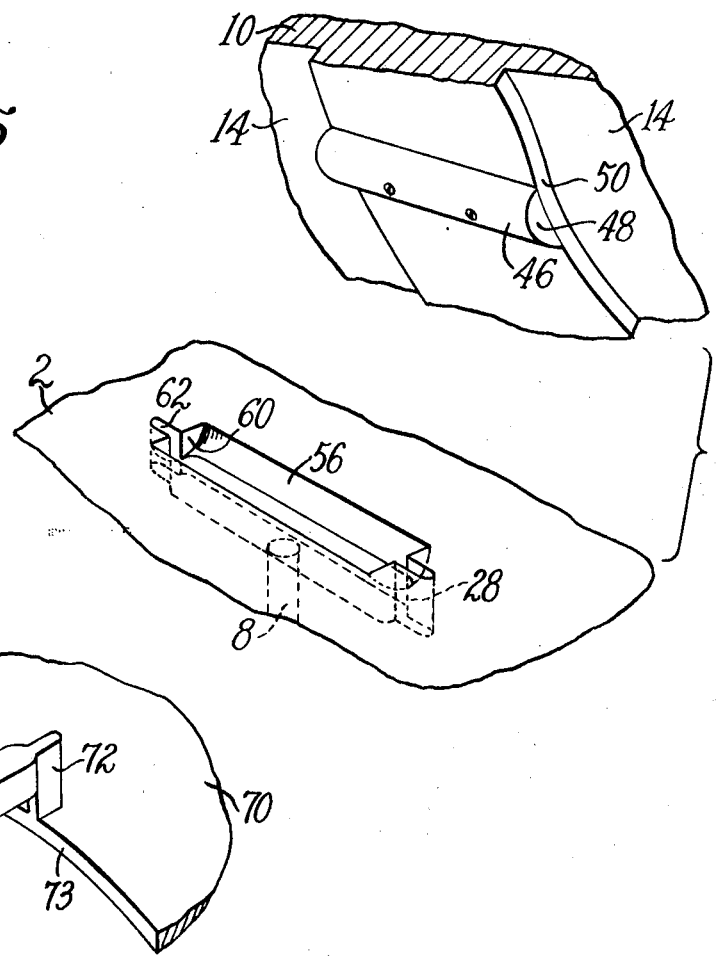
FIG. 5, is similar to FIG. 2, but shows the alternative embodiment of the invention.
Figure 6:
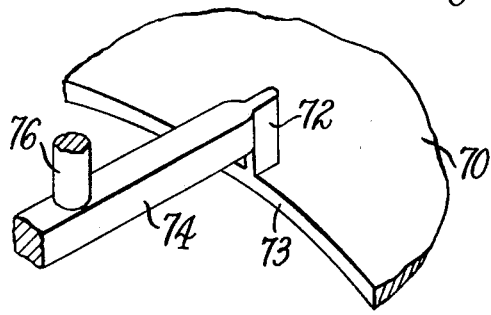
FIG. 6 is similar to FIG. 3, but shows a portion of a sole unit formed in the mold assembly of the alternative embodiment and before the sprue is removed.

Referring to FIGS. 4–6, there will now be described an alternative embodiment of the invention which includes a bridge member 46 having a generally semi-cylindrical cross-section and end surfaces 48 which are continuous and coplanar with side edge faces 50 of the recesses 14.

On the engagement surface of the first mold member 2 there is provided a channel 56 connecting in a center portion with the delivery bore 8 through which plastic material is injected. The channel 56 is arranged to leave a clearance 28 between the semi-cylindrical surface of the member 46 and the bottom of the channel. In end walls 60 of the channel there are provided grooves 62, one groove being formed in each wall. The grooves 62 extend the full depth of the channel 56 and the clearance 28. When the mold members are in the engaged position, plastic material may be injected through the bore 8 from the nozzle 6 and passes therefrom into the clearance space 28. The material is forced through two passageways, each bounded by one end surface 48 of the member 46 and the walls of the corresponding grooves 62 in the end wall of the channel 56, and into the two mold cavities. After the injection molding material has set, the shoe bottom units thus formed may be removed by separating the mold members and lifting the mold members from the recesses 14.

Referring to FIG. 6, there may be seen a fragmentary view of the shank portion of one such molded sole unit 70 prior to removal of the sprue. A narrow neck 72 of the sprue projects from the attachment surface of the unit 70 at a point adjacent to a side edge face 73 thereof is in the shape of the passageway formed by the end surface 48 of the member 46 and the walls of the groove 62 in the end wall of the channel 56. Attached to the neck 72 is a portion of sprue 74 which is in the shape of the clearance 28. Another portion of sprue 76 corresponds to the bore 8. The scar remaining on the unit after the sprue has been removed at the base of the neck 72 is on the attachment surface of the shoe bottom unit and the finished units will, accordingly, bear no scarred portions on surfaces which will be visible when the units are ultimately fixed to footwear uppers to produce completed shoes.

Since certain obvious changes may be made in the illustrated assembly without departing from the scope of the invention, it is intended that all matters contained herein be interpreted in an illustrative and not a limiting sense.

Having thus described my invention, what I claim as new and desire to secure by Letters Patent of the United States is:

1. A mold assembly comprising first and second mold members movable relative to each other between a first position in which said mold members are separated and a second position in which faces of said mold members are in engagement to form a plurality of closed mold cavities, said second mold member having a plurality of recesses for the molding of articles therein, a bridge member outstanding from the face of said second mold member and interconnecting said recesses, said first mold member having a channel therein which receives said bridge member when said mold members are in said second position, said channel and said bridge member being of such configuration as to provide a clearance therebetween when said bridge member is in said channel, said first mold member having a bore for interconnecting a source of molding material and said channel, said clearance and said bore providing a passage interconnecting said molding material source and said mold cavities.

2. The invention according to claim 1 in which said assembly comprises a mold assembly for use in the molding of shoe bottom units and said recesses comprise two recesses substantially in the form of shoe bottom units and located side by side.

3. The invention according to claim 2 in which said bridge member extends from a shank portion of one recess to a shank portion of the other recess.

References Cited

UNITED STATES PATENTS

| | | | |
|---|---|---|---|
| 1,654,001 | 12/1927 | Howard | 18—42 |
| 2,763,028 | 9/1956 | Blake | 18—42 X |
| 2,988,779 | 6/1961 | Barton et al. | |
| 3,014,242 | 12/1961 | Baker et al. | |
| 3,091,812 | 6/1963 | Witowski | 18—30 XR |

FOREIGN PATENTS 456,228  4/1949  Canada.

J. HOWARD FLINT, JR., Primary Examiner

U.S. Cl. X.R.

18—30